United States Patent Office 3,300,863
Patented Jan. 31, 1967

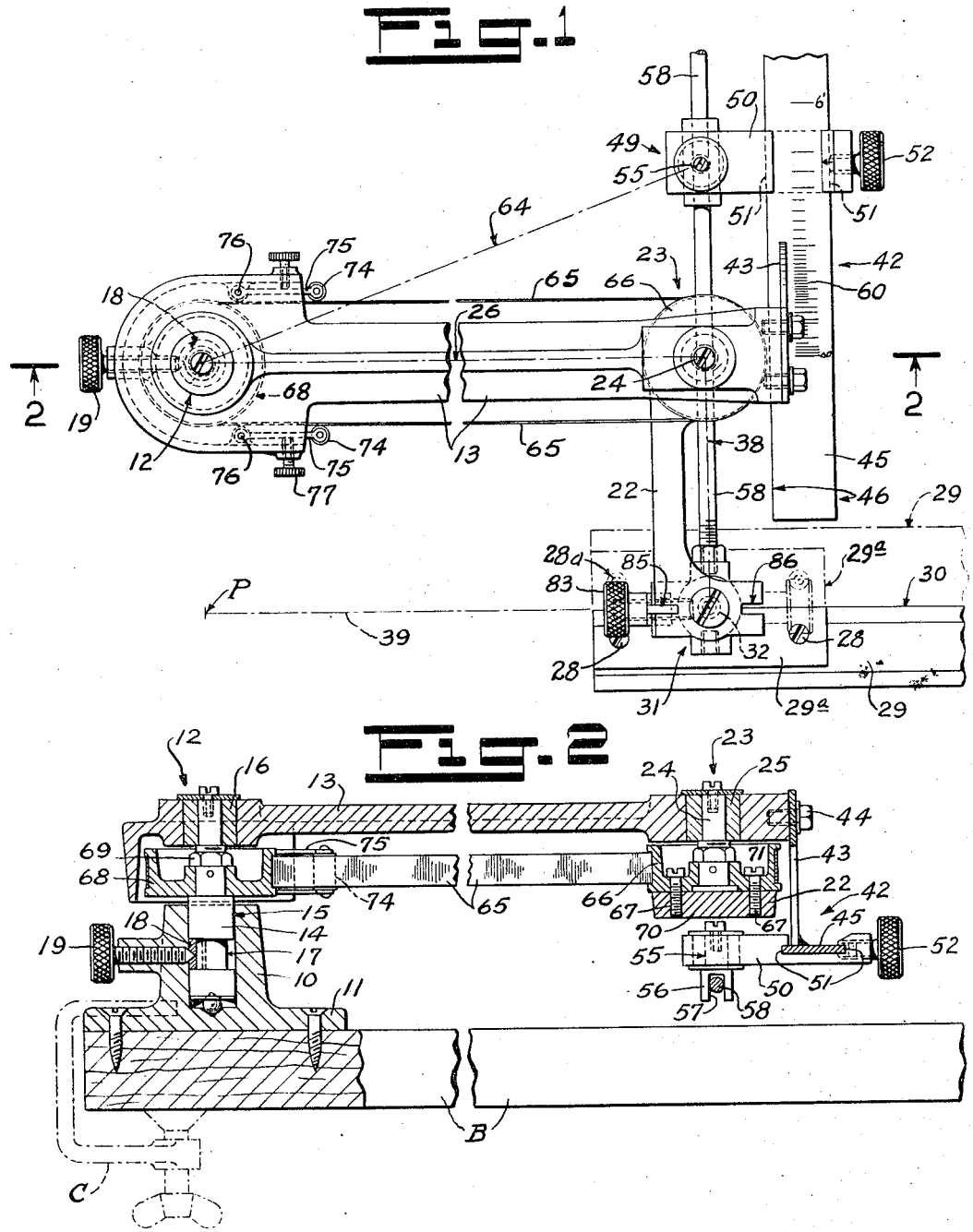

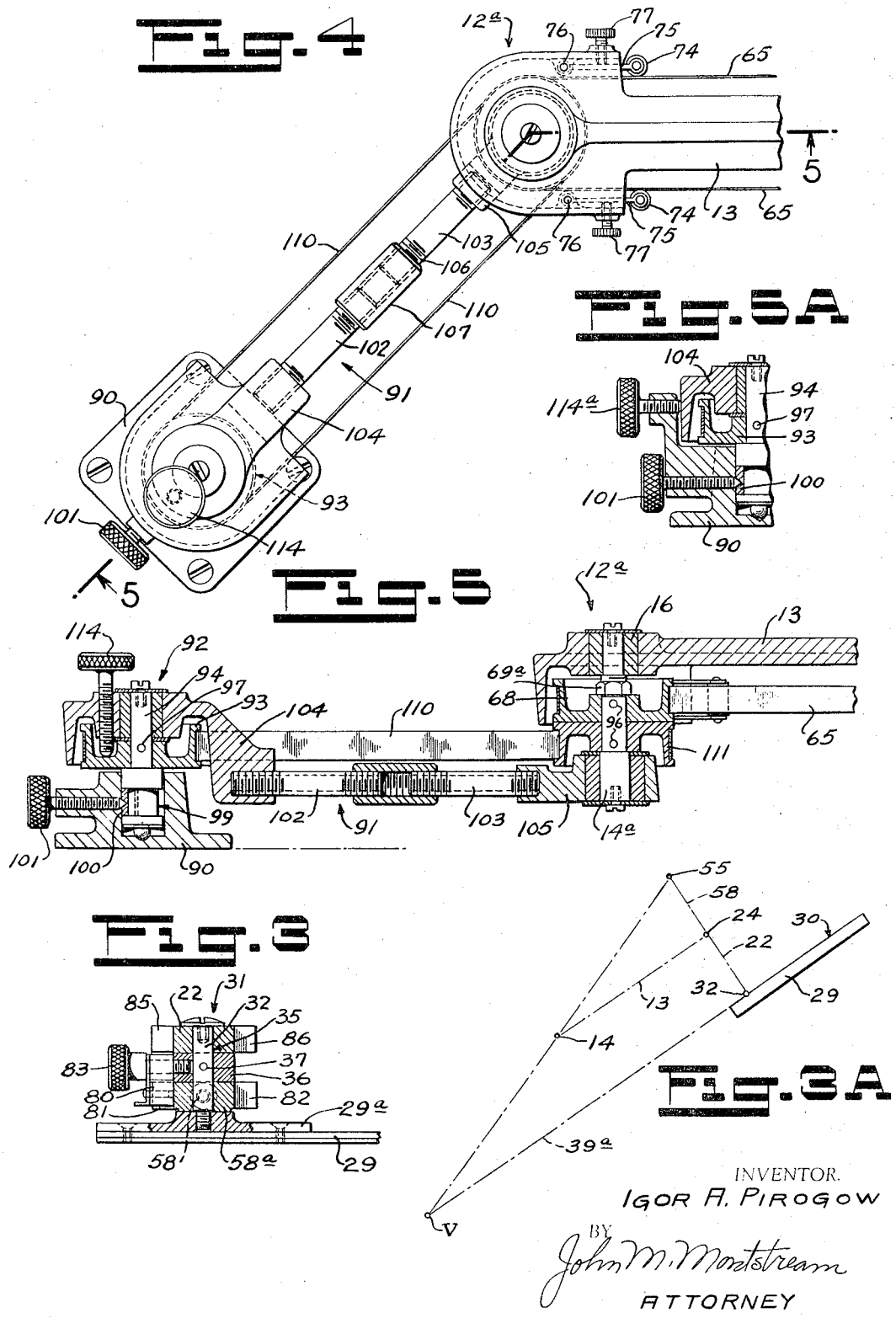

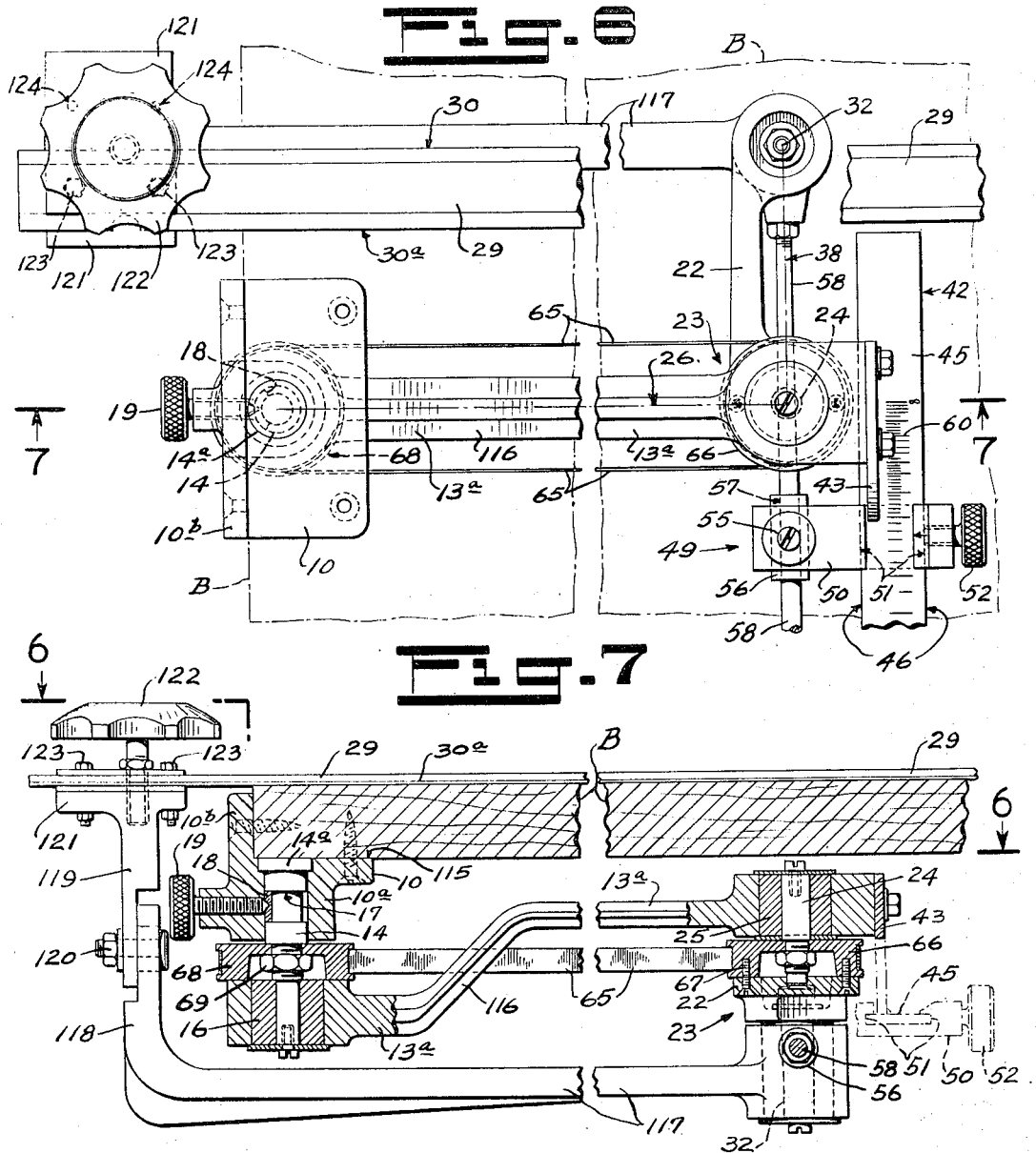

3,300,863
PERSPECTIVE DRAWING DEVICE AND COMBINATION OF PERSPECTIVE AND PARALLEL DRAWING DEVICE
Igor A. Pirogow, Georgetown Road, R.D.,
Erieville, N.Y. 13061
Filed May 13, 1965, Ser. No. 455,421
20 Claims. (Cl. 33—77)

The invention relates to a drawing device for perspective drawing which is an improvement over that of my Patent 2,854,750 dated October 7, 1958. The invention also relates to a drawing device for perspectives which is convertible into an efficient drawing device for parallel lines. The improvements are in two areas namely a simple construction for accomplishing perspective drawing in which the ruling edge is always in line with a fixed vanishing point particularly beyond the area of the drawing board on which it is mounted. The device functions just as well for vanishing points on the board, however, the imperative need in such positions is lacking. The other areas of improvements lie in several additional functions which are not achieved by my prior construction. In addition in another form of the device, the operating mechanism is beneath the drawing board whereby the entire drawing board is free of structure so that the entire drawing board surface is usable.

It is an object of the invention to construct a perspective drawing device which simplifies the mechanism for achieving a ruling edge which when moved over the drawing board maintains the edge in line with a fixed vanishing point particularly at a distance remote from the board, although the device functions equally well for a vanishing point on the drawing board.

Again it is an object as above but with means for adjusting the location of the vanishing point either laterally or vertically but preferably in both directions.

Another object is to construct a device as above and in addition one which is constructed so that it can be mounted on the right hand or the left hand edge of a drawing board.

A still further object is to construct a drawing device which is easily convertible from a drawing device for drawing perspectives into a drawing device in which the ruling edge remains in parallel positions in all positions of the ruling edge.

Another object is to construct a perspective drawing device primarily for perspective or a convertible drawing device for perspective or parallel drawing in which the operating means is mounted beneath the drawing board so that there is nothing over the board other than a ruling edge member.

A further object is to construct a drawing device for perspectives which broadens the area of the drawing board which may be used and permits the ruling edge to be horizontal over essentially the entire area of the drawing board.

It is also an object as in the preceding paragraph which combines this feature with means for easily converting the device for parallel drawing.

Another object is to construct a perspective drawing device which is adjustable to place the vanishing point to the left or right of the ruling edge pivot means.

Another object is to construct a drawing device for perspectives which has a wider range over a drawing board.

Other objects of the invention will be more apparent from the following description when taken in connection with the accompanying drawings illustrating preferred embodiments thereof as to the combination but with certain parts in simplified form for illustrative purposes, in which:

FIG. 1 shows a plan view of the drawing device adapted for both perspective and plane or parallel drawing.

FIG. 2 is a section through a portion of the drawing device taken on line 2—2 of FIG. 1.

FIG. 3 is a section through the ruling edge pivot means taken on line 3—3 of FIG. 1.

FIG. 3A is a diagrammatic view of the device adjusted for a vanishing point located well below the instrument.

FIG. 4 is a plan view of a base member on which the drawing device is mounted for increasing the range of the drawing device.

FIG. 5 is a section taken on line 5—5 of FIG. 4.

FIG. 5A is a partial view of a modified FIG. 5 structure.

FIG. 6 is a plan view of a construction of drawing device to be mounted underneath the drawing board and with solely the ruling edge member over or on the board.

FIG. 7 is a side view of the drawing device of FIG. 6, with portions in section.

The drawing device includes base means having at least a base 10 which is suitably fastened by screws 11, a clamp or the like to the drawing board B such as at an edge thereof. A single arm 13 is pivotally mounted upon the base means through an arm pivot means 12 which includes a pivot 14 having a vertical axis. This pivot is secured in a vertical bore 15 carried by the base means. The arm has a bearing 16 for pivotally mounting the arm on the arm pivot means.

Preferably, means is provided to adjust the position of the arm pivot means on the base means and clamp it in adjusted position. Any suitable means may be used for the adjustment, that shown including a peripheral groove 17 in that part of the pivot 14 which is within the bore 15 of the base. An arcuate clamp plate 18 is received in the groove which clamp plate is clamped against the pivot such as by a clamping screw 19 threaded into the base. With this adjustment the location of the vanishing point may be adjusted to a position below or above the horizontal line 39 determined by the position of the ruling edge as located in FIG. 1. There are other forms of clamping means which may more easily lock the pivot means in adjusted position so that the form shown is illustrative only. Without the above adjustment, variation in the level of the vanishing point could be secured by providing a clamp C (dot dash lines FIG. 2) to fix the device to the edge of the drawing board which enables the device to be raised and lowered along the vertical edge of the board and to be moved to the top, bottom and right hand edge of the drawing board.

A lever 22 is pivotally mounted on the arm by lever pivot means 23 at a point spaced from the arm pivot means. This lever pivot means has a vertical axis and includes a pivot 24 which is mounted on the lever in any suitable fashion. The particular attachment illustrated will be described hereinafter. The arm carries a bearing 25 which receives the pivot of the lever pivot means. The lever is shown, in the device illustrated, as being located below the arm. The arm has an axis 26 defined by a line through the axes of the arm pivot means 12 and the lever pivot means 23.

The lever pivotally carries ruling edge means including at least a ruling edge member 29 with its plate 29a secured thereto and the ruling edge member having a ruling edge 30. The ruling edge means is mounted on the lever by ruling edge pivot means 31, FIG. 3, which has a vertical axis. This pivot means includes a pivot 32 which is secured to the ruling edge member such as by the threaded end 33 being threaded into the plate 29a. For perspective drawing, the ruling edge means pivots in a bearing 35 carried by the lever. For a combination or convertible drawing device the ruling edge means includes a hub 36 which is secured to the pivot 32 such as by a pin 37. The ruling edge is located in alignment with the axis of the ruling edge pivot means. The conversion structure associated with the ruling edge pivot means will be more fully described hereinafter. The lever has an axis 38 defined by a line through the axes of the lever pivot means 24 and the ruling edge pivot means 31.

Control means is provided to control the movement of the ruling edge member so that it will have a pivotal movement on the ruling edge pivot means during vertical shifting or movement of the ruling edge member with the ruling edge at all times aligned with a fixed vanishing point. Broadly, the vanishing point will be on a line which is an extension of the ruling edge when the lever axis 38 is at right angles to the arm axis 26. Specifically as to FIGURE 1, with the arm 13 in horizontal position and the lever axis at right angles thereto, the vanishing point will be on an extension to the left of the base or horizon line 39 of the ruling edge 30 which would in this case be on a horizontal line. In the drawings, the base line and the horizontal horizon line coincide but it need not be so as will be apparent hereinafter.

The drawing device may be constructed with a vanishing point at one fixed distance, however, it is particularly desirable that the location of the vanishing point, to the left of the ruling edge pivot means be varied as desired from a reference point P. The point P is the other corner of a right angled parallelogram with the arm as one side and the lever as another side or edge.

The control means controls the pivotal movement of the ruling edge means and member so that the ruling edge 30 will always be in line with a fixed vanishing point irrespective of the vertical movement or position of the ruling edge member. This control means for a drawing device having a vanishing point which is adjustable as to distance, includes guide means 42 which is carried by the arm and preferably spaced from the lever pivot means. For a vanishing point to the left, this guide projects upwardly with respect to the arm 13 or lever pivot means 23 with a downwardly projecting lever. In other words the guide may project solely in a direction oppositely from that of the lever with respect to the lever pivot means or the arm. As shown, the guide also projects below the axis of pivot 24 or downwardly so that the control pivot 49 may be adjusted to be located below arm 13 and when so positioned the vanishing point is on the right. This lower portion of the guide may carry a scale for aid in setting if desired. The guide means particularly illustrated includes an arm bracket 43 which is secured to the end of the arm such as by bolts 44 and to this bracket is secured a guide means which may be of any suitable form, that illustrated being a simple form, namely, a guide bar 45 having parallel edges 46 which forms the guide. The guide or edges of the bar are perpendicular to the arm axis 26.

The control means includes a control pivot means 49 carried by a guide bracket 50 which is shown as adjustable along the guide bar 45. The guide bracket has grooves 51 which receive the edges of the guide bar and a locking screw 52 carried by the guide bracket clamps the guide bracket to the bar in adjusted position. This guide bracket carries control pivot means which includes a control pivot 55 having a vertical axis and the pivot means is pivotally mounted on the control means bracket 50. The axis of the control pivot is at all times on a line passing through the axis of the lever pivot means 23 and vertical to the arm axis 26. The control pivot means carries a control guide or slide 56 which may take several forms, that shown being a simple form comprising a simple slot 57, the axis of which slot is at right angles to the axis of the control pivot means.

The control means also includes a control rod or bar 58 which for perspective drawing is secured or locked to the ruling edge member in any suitable manner. The attachment shown is designed for converting the drawing device to and from a perspective drawing device and a horizontal or parallel drawing device. It is for this reason that the connection will be described hereinafter. In a drawing device which is to be used for drawing perspective views solely, the connection may be a permanent one. This control rod or bar is slidably received in the control guide or slot 57. The axis of the control bar is in alignment with the axis of the control pivot means 55. It is clear that the drawing device may have a single vanishing point by having but one fixed position for the control pivot means. The adjustment along the guide means enables the vanishing point to be adjusted from infinity to any finite distance as desired.

The guide bar carries a scale 60 for selecting the location of the vanishing point. In other words, when the control means bracket is at the scale line ∞, i.e. infinity, in which position the axis of the control means pivot is in alignment with the axis of the lever pivot means, the ruling edge member will always be horizontal and will draw parallel lines irrespective of the position of the ruling edge. In other words, the vanishing point is at infinity. As the control means bracket 50 is moved upwardly away from the lever pivot means 23, the vanishing point moves to the right or closer to the drawing board. As the vanishing point approaches the drawing board the adjustment factor diminishes so that closely spaced markings adjacent to the infinite mark provide equal linear adjustments of the vanishing point with wider spacing between respective position marks on the scale as the scale markings are located farther away from infinite position.

The particular scale used is dependent upon two factors namely the length of the arm, or the distance between the axes of the arm pivot means and the lever pivot means, as well as the length of the lever, or the distance between the axes of the lever pivot means and the ruling edge pivot means. Changing either dimension or constructing a device with the dimensions changed, requires a different scale. Changing both dimensions requires a change of scale also. For example, the uppermost marking shown as six inches for the location of the vanishing point, and the figure being half scale, for an arm length of six inches and a lever length of four inches, this mark is four inches above ∞. The formula which determines spacing of the marks or cross lines of the scale is a simple formula of proportional right angled triangles in which $y$ equals A times B over V; in which V is the location of the vanishing point to the left from the point P; A is the length of the arm; B is the length of the lever and $y$ is the distance of the scale mark above the infinite scale. The point P has been located above. It is apparent from the formula that an increase in the length of the lever would result in the scale marks being spaced farther apart for equally spaced distances of the vanishing point. It is also apparent that using a greater dimension for the length of the arm would also increase the spacing between marks for the same linear distances of the vanishing point from the point P. It is also apparent that greater accuracy in scale marking is secured from a long arm or a long lever or both, however, for practical reasons they cannot be made too long.

An operating connection is provided between the base means and the lever so that the lever 22 is always in the same relative angular position with respect to the base means. For example, with the arm 13 in horizontal position and the lever axis 38 at right angles to the arm axis, the ruling edge will establish a base and horizon line 39 which in this case is horizontal and the vanishing point is at the left on this horizontal line at the intersection of line 64 therewith which passes through the axes of the arm pivot means 12 and the control pivot means or pivot 55 in this one position. This connection may take other forms and a simple form is illustrated using a bendable band 65 and fixed pulleys. A first fixed pulley 66 is fixed to the lever on the axis of the lever pivot means 23 such as by bolts 67. A second fixed pulley 68 of the same diameter is secured to the base means on the axis of the arm pivot means such as by being anchored to the pivot 14 by a nut 69. It is this first pulley 66 with its bolts 67 which provides a convenient attachment of the pivot 24 of the lever pivot means to the lever such as by a flange 70 and nut 71.

The flexible band 65 is secured to the fixed pulleys in any suitable fashion and a convenient method is to have a continuous band which passes around both pulleys and is frictionally attached to the pulleys so that there is no slippage between the band and the pulleys. One way to assure this is by providing at least one tightening roll 74 carried by a roll lever 75 mounted on the arm 13 such as on a pivot 76. A screw 77 carried by the arm and engaging the roll lever is adjusted to increase or decrease the tension of the band on the pulleys so that it is taut. Two such band tightening means are shown carried by the arm on opposite spans of the band so that the frictional contact is sufficient to insure that there is no slippage between the band and the pulleys. A gear train is a known equivalent operating connection, however, there must be no backlash in the gears.

When the drawing device is solely a perspective drawing device with the pivoting of the ruling edge member controlled by the control means, it is used simply by raising and lowering the ruling edge member over the drawing board. In this movement the arm pivots on the arm pivot means 12 or pivot 14 and the lever pivots on the lever pivot means 23 or pivot 24 so that the lever is always in the same relative position to the base means which as illustrated would be a vertical position. The control pivot means 49 moves on an arc which has the axis of the arm pivot means as its center so that as the ruling edge member is moved upwardly and the arm pivots upwardly, the control means gives the ruling edge member a tilt thereto such that the ruling edge 30 in all positions on the drawing board is in alignment with the vanishing point which has been adjusted into the device.

In order to position the vanishing point below the horizontal line 39 of FIG. 1, see FIG. 3A, the clamping screw 19 is loosened and the arm 13 is pivoted upwardly, with the axis of the lever 22 kept at right angles to the axis of the arm through this adjustment. When the arm has been adjusted angularly to the desired position, the clamping screw 19 is tightened. In this position the vanishing point V is on a base line 39A which is not horizontal but which is on an angular line which is an extension of the ruling edge 30 in that position in which the lever 22 is at right angles to the arm 13. Similarly, the vanishing point may be located above the horizontal line 39 by having the position where the lever 22 is at right angles to the arm 13 below the horizontal line 39 or below the pivot means 12. The base line and the horizontal horizon line coincide only when the arm is horizontal with the lever at right angles to the arm axis in this position.

The drawing device (FIGS. 1 and 3) is convertible to a device which may be mounted on the opposite vertical side of the drawing board with a simple mechanism which includes a key 80 carried by the hub 36 of the ruling edge means at the ruling edge pivot means which key is received in a notch 81 carried by the hub 58a of control rod 58. On the opposite side of this pivot means on the control rod hub is a similar notch 82 spaced 180 degrees therefrom. This key is held in position in its slot by a screw 83 threaded into the ruling edge member hub. By removing the key from the slot 81 and rotating the ruling edge member on the ruling edge pivot means through 180 degrees, the key is inserted into the other slot 82 of the control rod hub. Screw holes 28a are provided on the other end of the ruling edge member to reverse the member so that it projects over the board. In this position, the device functions in the same manner for perspective drawing with the base means mounted on the right hand side of the drawing board.

The drawing device illustrated can be converted so that it functions as a parallel or plane drawing device with the ruling edge 30 always being horizontal by adjusting the control bracket to the infinity mark ∞ on the guide scale. Although no difficulty is envisaged in accurately making this adjustment, however, to provide a more positive structure, the lever has a notch or slot 85 carried by the hub of the lever so that when the conversion is to be made the key is removed from the lower slot 81 which is in the control rod hub and turned around and inserted in the upper slot 85 which is in the lever. This disconnects the connection between the straight edge member and the control means so that it no longer is effective and the straight edge member is fixed at right angles to the lever. The lever similarly carries a second notch or slot 86 which is 180 degrees spaced from notch 85 with respect to the ruling edge pivot means so that by turning the ruling edge member through 180 degrees and inserting the key into the notch 86, a drawing device is provided adapted to be mounted on the right hand side of the drawing board.

Another definite advantage of this conversion feature is that in making perspective drawings, the vertical lines of the drawing are and should be vertical. Therefore, when the perspective lines have been drawn, the key 80 may be shifted to slot 85 (or 86 for right hand mounting) whereupon the device is converted to parallel drawing, or vertical lines with a triangle, or a vertical extension as is common with drawing devices, without changing the vanishing point setting for return conversion for drawing additional perspective lines.

It will be seen, therefore, that the drawing device is convertible to and from a drawing device for perspective drawing and for parallel lines or plane drawing and either conversion is available for either a right hand or a left hand mounting of the drawing device on the drawing board. It is obvious that the device can also be mounted on the top or bottom edge of the drawing board merely by unloosening the clamping bolt 19 and its clamp plate 18 and turning the base means or base 10 to the desired position, or through 90 degrees, after which the clamping means is tightened to fix the arm pivot means in the adjusted position.

In order to increase the capabilities or area of usefulness of the drawing device, it may be provided with auxiliary mounting means as illustrated in FIGS. 4 and 5. In these figures the base 90 has been turned through 45 degrees for convenience in illustration, the base normally having its edge on the drawing board edge, with the clamping screw 101 horizontal. In this construction the base means includes a base 90 and a base member 91 having the arm pivot means 12a at the outer end thereof. This arm pivot means 12a functions in the same manner as the arm pivot means 12 for the drawing device of FIGS. 1 and 2. The base member is pivotally mounted on the base by means of base pivot means 92. A base or third fixed pulley is secured to the base or preferably to a base pivot 94 so that its position may be adjusted. For a pulley and band type of connecting means, the arm pivot 14a carries a cooperating pulley 111 which is secured to the second pulley such as by being secured to the pivot through pins 96 extending into the pivot or by being clamped together by the nut 69a. The two pulleys secured together form the second fixed member for this type of construction. This arm pivot means, however, does not carry the clamping means of the arm pivot of FIGS. 1 and 2. The base 90 is essentially identical with the base of FIG. 2 and the base pivot 94 is also essentially identical with the arm pivot of FIG. 2. This base 90 includes suitable clamping means such as a groove 99 in the pivot, an arcuate clamp plate 100 in the groove in the pivot, and a clamping screw 101 threaded into the base and engaging the clamp plate.

Since the length of the base member 91 is of no importance, it may be a member adjustable as to length and constructed of a pair of rods 102, 103, one being threaded into a bearing portion 104 and the other being threaded in another bearing portion 105 and having a left hand thread 106. A coupling sleeve 107 having right and left hand threads connects the adjacent ends of the rods for lengthening the base member or shortening the same for a band type of base connecting means. Lengthening the base member will tighten the band.

It is desirable to maintain the lever in its adjusted position, for example vertical, in all positions of the base member and the arm. Suitable base connecting means may be provided for this purpose, that shown including the third fixed member or pulley 93 which is fixed to the pivot 94 such as by a pin 97 and which is adjustably fixed to the base through the pivot 94 and clamp screw 101. An operating linkage, such as a base member flexible band 110, connects the third fixed member or base pulley 93 with the second fixed member. The second fixed member comprises a pair of pulleys 68 and 111 secured together. The band may be fixed to the pulleys by frictional contact so that upon adjustment of the angular position of the base member 91, or pivoting of the base member, the lever is maintained in its working position irrespective of to what angle the base member is adjusted for perspective drawing or moved in parallel drawing.

The base member 91 carries a clamping screw 114 which is positioned to clamp the third fixed member or base pulley 93 to the base member so that the position of the base member may be adjusted as desired for any particular position as will appear. FIG. 5A shows the base member and the base directly clamped together by a screw 114a carried by one part and engaging the other. In the broader aspect of the invention, the base means may be solely the base 10 of FIG. 1 or it may be the base 90 and the base member 91 of FIG. 5 and preferably its associated base connecting means between the third fixed member 93 and the second fixed member 66. The connecting means 65 and 110 retains the lever in its selected position of the base member and the pivotal movement of the arm.

The drawing device of FIGS. 4, 5, and 5A for perspective drawing enables the horizontal horizon line to be adjusted over, or practically over, the entire area of the drawing board. Loosening screws 114 and 101 (FIG. 5) and adjusting the base member 91, raises or lowers the arm pivot means 12a. The arm 13 and ruling edge member are adjusted to their desired position, after which the screws 114 and 101 are tightened. This fixes the position of the second fixed member 111, 68 and also the first fixed member 66 and the lever. In FIG. 5A, the screws 114a and 101 permit separate adjustment of the base member 91 and the arm and ruling edge member. These constructions enable the base line and the horizontal horizon line to coincide over the entire drawing board or the vertical range of the base member from vertically up to vertically down. The base line may be angular as desired by loosening the screw 101 and adjusting the position of the arm 13 angularly with the lever being at right angles to the arm.

When the drawing device of FIGS. 4 and 5 is converted to a parallel drawing device by the conversion shown in FIG. 3, the clamping screw 114 is loosened and the screw 101 is tightened so that the base member 91 can pivot freely on the pivot 94. The ruling edge member can be moved over the entire area of the drawing board. In order to draw parallel lines at an angle, the clamping screw 101 is loosened and the third fixed member or pulley 93, or the ruling edge member 29, is adjusted to the desired angle and then screw 101 tightened to clamp the pulley 93 in adjusted position whereupon the ruling edge moves parallel but at an angle. The range of the drawing device for parallel lines is materially increased with this construction.

FIGS. 6 and 7 illustrate a form of construction which is essentially the same as that illustrated in FIG. 1 with similar parts similarly numbered but so constructed that it can be mounted beneath the drawing board and the sole element on the board is the ruling edge member. One of the changes in the construction of FIG. 1 so as to adapt the drawing device for this location is that the arm 13a has a mid-portion bend 116 in order to bring the lever pivot means 23 closer to the underside of the drawing board B or close to the base surface 115 and in this manner conserve space. The ruling edge member, however, is not mounted directly on the ruling edge pivot. A ruling edge bracket 117 is mounted instead on the ruling edge pivot 32 of the ruling edge pivot means 31. This bracket has a lateral extension 118 including an adjustable element 119 which are secured together by an adjusting bolt 120. This lateral extension element carries a pad 121 to which the ruling edge member 29 is secured. The lateral extension element is adjustable so that the ruling edge member may be positioned properly on the top surface of the drawing board B. A suitable knob 122 may be provided on the extension element for manipulating the ruling edge member over the board. The ruling edge member therefore, includes the ruling edge member 29 of FIGS. 1 and 2 or the ruling edge member of FIGS. 6 and 7 with the ruling edge bracket or bracket means 117, 118, 119, 120 and 121.

With the ruling edge bracket secured to the ruling edge pivot means in the same manner that the ruling edge member of FIG. 1 is fastened thereto, the ruling edge bracket and hence the ruling edge member is controlled by the control means in the same manner for perspective drawing. This ruling edge bracket moves identically as the ruling edge member of FIG. 1 and since the ruling edge member is secured to this bracket any movement of the ruling edge bracket is imparted to the ruling edge member. The base 10a may be the base 10 of FIG. 1, however, base 10a is of that kind which provides a side flange 10b to engage the edge of the board. The pivot pin 14 could be supported by the clamp 18, however, a flange 14a is provided on the end of the pivot.

This under the board construction of drawing device is suitable without change for either right hand or left hand mounting on the drawing board other than changing the position of the ruling edge member on the pad so that the ruling edge 30a on the opposite side is on the upper edge of the ruling edge member. The ruling edge 30a is brought into alignment with the axis of the ruling edge pivot means 32, which is a necessary position of the ruling edge for perspective drawing, by removing the bolts 123 and remounting the ruling edge member on the pad using the holes 124. Similarly this drawing device may be positioned along either the top or the bottom edge of the drawing board and requires merely loosening of the base clamping means or bolt 19 and turning the base member. This may be expressed in another manner namely the clamp for the arm pivot is loosened and the base is turned counterclockwise for attachment to the bottom edge of the drawing board. If it is desired to have the arm 13a horizontal, the base is turned through 90 degrees. For mounting the drawing device on the top edge of the drawing board, the base is turned clockwise. Again if it is desired to have the arm 13a horizontal, the base is turned 90 degrees. In order to adjust the position of the vanishing point with the under the board construction of FIGS. 6 and 7, the arm is pivoted or the ruling edge is moved so that the vanishing point scale 60 projects beyond the edge of the drawing board to expose the scale.

In the operation of the drawing device for perspective drawing the ruling edge member 29 is moved upwardly or downwardly on the drawing board and the arm 13 is pivoted. The operating connection between the base means and the lever pivot means 23 maintains the lever in the same angular position for all movements of the arm 13. Since the control pivot means 49 is attached to the arm at right angles to the arm axis and through the axis of the lever pivot means 23, the control pivot means moves in an arc, the center of which is the axis of the arm pivot means 12. It will be seen therefore, that the control pivot means moves to the left relatively to the ruling edge pivot means at a rate determined by the arc of this circle. Since the ruling edge 30 is vertical to the control rod 58, the ruling edge tilts with the latter to maintain the ruling edge always in line with the selected vanishing point. The same operation applies in a setting or adjustment in which the lever is perpendicular to the arm axis with the arm and ruling edge in an angular position as previously described. This operation also is applicable to the drawing device for mounting under the board, FIGS. 6 and 7. The drawing device of FIGS. 4 and 5 also functions for perspective drawing identically with the operation as from the arm pivot. Adjustment of the base member maintains the arm pivot in its same position relatively to the base or drawing board through the base member connecting means so that in this construction there is no change in the operation of the drawing device for perspective or parallel drawing yet by enabling adjustment of the position of the arm pivot means, the horizontal location or the location of the base or horizontal line may be raised or lowered over the face of the board.

The various bearings illustrated are shown as bushings, for simplicity, however, they are preferably ball bearings for easier manipulation of the device. The arm, lever and control rod are supported above the drawing board so that the lever, control rod and ruling edge member may swing beneath the arm and the control rod beneath the lever and the ruling edge member beneath the control rod, as shown particularly in FIG. 3 with the ruling edge member 29 resting on the drawing board.

The perspective drawing device may be constructed with a single position for the control pivot means in which construction the vanishing point is a fixed distance from the reference point P. With a guide means extending from the arm solely oppositely from the lever, vanishing points on the left only are available for a left hand edge mounting of the device. With guide means extending from the arm solely on the same side as the lever vanishing points on the right only are available for a left hand edge mounting. With the guide means extending on both sides of the arm, vanishing points on both the left and right hand side of the device are available for a left hand mounting.

The base line for perspective drawing is the line of the ruling edge 30 in that position in which the lever axis 58 is at right angles to the arm axis 26 and may be horizontal as 39 or may extend angularly as illustrated by the line 39a of FIG. 3A. The horizon line is a horizontal line which contains the vanishing point. The base line and horizontal horizon coincide when the arm is horizontal and the lever is at right angles thereto.

In the drawing devices illustrated, the lever 22 of FIG. 1 and FIG. 6 is not in alignment with the lever axis 38 but is offset to one side thereof between its ends or pivot means towards the arm pivot means. The reason for this is, that when the arm 13 is pivoted downwardly the guide means bracket 43 will eventually come into contact with the lever 22. By off-setting the lever between its ends, the bracket 43 avoids coming into contact with the lever until the downward rotation of the arm is about 110 degrees. This angular range of movement can be increased by increasing the off-set. The downward range of pivotal movement of the drawing device becomes a factor only when the drawing device is mounted well near the top of the drawing board. With the length of the lever 22 being short enough with respect to the length of the arm 13 so that the ruling edge structure will avoid the base means 10, the upward pivotal range of the drawing device is at least 90 degrees. The length of the arm 13 may be any length desired, however, in order to have a range for the ruling edge member over the entire drawing board the length of this arm would approximate ½ the vertical height of the drawing board.

The drawing device of FIG. 1 has maximum utility as a perspective drawing device and a fair degree of utility as a drawing device for drawing parallel lines. With the base arm 91 added thereto, however, the drawing device becomes somewhat improved in its utility as a perspective drawing device but becomes of maximum utility when converted to a drawing device for drawing parallel lines. The ruling edge member illustrated is of a simple form having a single ruling edge. For the drawing device of FIG. 4, the utility of the device for general drawing purposes would be improved if the simple ruling edge member were replaced with a known ruling edge member having additional features such as a vertical ruling edge or a protractor head.

It has been explained above, that the vanishing point may be located above or below the horizontal line 39 by altering the angularity of the lever 22 with respect to the base means 10. In the position illustrated in FIG. 1, the lever 22 is at right angles to the arm 13 when the arm is horizontal. Since the arm pivots, the angularity between the arm and the lever changes as the arm pivots, and it is for this reason that reference to the angularity of the lever with respect to the base means is more significant, whether or not the base means is the simple form of FIG. 1, or the more complex base means of FIG. 4 which includes the base member 91. Basically, lever adjusting means is provided to change the angularity of the lever with respect to the base means. A simple form of achieving this adjustment is to adjust the angular relationship of the second fixed pulley 68 with respect to the base means, through the locking screw 19 and plate 18. The adjustment could just as well be provided between the first fixed pulley 66 and the arm 22, however, when so located the angular adjustment is not as conveniently made. To express the angular adjustment in another manner, the locking screw 19 is loosened and the arm 13 held in horizontal position. The angularity of the lever 22 with respect to the arm 13 may then be adjusted and the second fixed pulley 68 through the band 65 is angularly adjusted with respect to the base means 10. When the desired angularity of the lever has been achieved the clamping screw 19 is tightened. For example, if the lever 22 has been angularly adjusted to the right and then tightened, the lever 22 retains this angularity with respect to the base means throughout the pivotal movement of the arm 13. There is one point in this pivotal movement of the arm 13 in a counterclockwise direction from horizontal position, where the lever 22 is at right angles to the arm axis 26. It is in this position that the extension of the line of the ruling edge 30 to the left and the extension of the line 64 to the left locates the position of the vanishing point for this angularity. Of course extending the line of the ruling edge line 30 in any two positions of the drawing device will similarly locate the vanishing point.

This invention is presented to fill a need for improvements in perspective drawing device and combination of perspective and parallel drawing device. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A drawing device at least for perspective drawing comprising base means, a single pivotal arm, arm pivot means having a vertical axis and pivotally mounting the arm on the base means, a lever, lever pivot means having a vertical axis and pivotally mounting the lever on the arm at a point spaced from the arm pivot means, an operating connection between the base means and the lever to maintain the latter in the same relative angular position with respect to the base means throughout the pivotal movement of the arm including a first fixed member secured to the lever and a second fixed member secured to the base means, and a connecting linkage between the fixed members; ruling edge means including a ruling edge member having a ruling edge, ruling edge pivot means pivotally mounting the ruling edge means on the lever at a point spaced from the lever pivot means and having a vertical axis, and the ruling edge being in alignment with the axis of the ruling edge pivot means; and control pivot means having a vertical axis and carried by the arm, the control pivot means including a control pivot having its axis on a line extending from the axis of the lever pivot means and vertical to a line between the axes of the arm pivot means and the lever pivot means, slide means carried by the control pivot having its axis at right angles to the axis of the control pivot, and control rod means secured to the ruling edge means and extending at right angles to the ruling edge and slidably received by the slide means carried by the control pivot means.

2. A drawing device as in claim 1 including adjusting means to adjust the relative fixed angular position of the lever with respect to the base means.

3. A drawing device as in claim 2 in which the adjusting means includes means to adjust the angular position of the second fixed member on the base means.

4. A drawing device as in claim 1 including guide means secured to the arm adjacent to the lever pivot means and extending laterally from the arm at right angles to a line between the axes of the arm pivot means and the lever pivot means, a guide bracket adjustably mounted on the guide means, and the control pivot means being carried by the guide bracket.

5. A drawing device as in claim 4 in which the guide means extends on both sides of the arm axis for locating the vanishing point on the left or right of the lever.

6. A drawing device as in claim 4 including adjusting means to adjust the angular position of the lever means with respect to the base means.

7. A drawing device as in claim 6 in which the adjusting means angularly adjusts the position of the second fixed member with respect to the base means.

8. A drawing device as in claim 7 in which the arm pivot means includes an arm pivot, the second fixed member being secured to the arm pivot, and the adjusting means being carried by the base means and engaging the arm pivot.

9. A drawing device as in claim 4 in which the first fixed member carried by the lever is a fixed pulley and the second fixed member carried by the base means is a fixed pulley, and the connecting linkage includes flexible band means immovably carried by the fixed pulleys.

10. A drawing device as in claim 4 including positioning and interengaging means carried by the lever and the ruling edge member to locate the ruling edge member in either of two positions 180 degrees apart with respect to the lever and to selectively engage one of the parts including the ruling edge member and the lever.

11. A drawing device as in claim 4 in which the base means includes a base and a base member, the arm pivot means being carried by the base member at one end thereof, base pivot means mounting the base member on the base at a point spaced from the arm pivot means and having a vertical axis.

12. A drawing device as in claim 11 including a base operating connection between the base and the second fixed member to maintain the second fixed member in the same position relative to the base upon pivotal movement or adjustment of the base member including a third fixed member carried by the base, and a connecting linkage between the third fixed member and the second fixed member.

13. A drawing device as in claim 12 in which the base pivot means includes a pivot, the third fixed member being secured to the pivot, and means to adjust the relative position of the third fixed member with respect to the base member.

14. A drawing device as in claim 12 in which the base pivot means includes a pivot, and means to adjust the pivot with respect to the base.

15. A drawing device as in claim 14 including adjusting means to adjust the relative position of the third fixed member with respect to the base member.

16. A drawing device as in claim 12 in which the third fixed member carried by the base is angularly adjustable with respect to the base member.

17. A drawing device as in claim 16 including positioning means carried by the lever and the ruling edge member to locate the ruling edge member in either of two positions 180 degrees apart.

18. A drawing device as in claim 1 in which the base means includes a base and a base member, the arm pivot means being carried by the base member at one end thereof, base pivot means mounting the base member on the base at a point spaced from the arm pivot means and having a vertical axis, and a base operating connection between the base and the second fixed member to maintain the latter in the same position relative to the base upon pivotal movement or adjustment of the base member including a third fixed member carried by the base, and a connecting linkage between the third and second fixed members.

19. A drawing device as in claim 18 including adjustment means carried by the base to adjust the relative angular position of the third fixed member relatively to the base.

20. A drawing device as in claim 18 in which the base pivot means includes a pivot, the third fixed member being secured to said pivot, and the adjusting means adjusts the position of the pivot.

No references cited.

LEONARD FORMAN, *Primary Examiner.*